United States Patent [19]

Colli et al.

[11] Patent Number: 4,896,840

[45] Date of Patent: Jan. 30, 1990

[54] COMMAND AND CONTROL DEVICE FOR THE MEMBERS OF RESTORATION OF THE THREAD CONTINUITY ON CONER MACHINES

[75] Inventors: Luigi Colli; Roberto Badiali; Nereo Marangone, all of Pordenone, Italy

[73] Assignee: Savio S.p.A., Pordenone, Italy

[21] Appl. No.: 152,659

[22] Filed: Feb. 5, 1988

[30] Foreign Application Priority Data

Feb. 6, 1987 [IT] Italy ................... 19275 A/87

[51] Int. Cl.⁴ .................. B65H 54/20; B65H 54/22
[52] U.S. Cl. ..................... 242/35.5 R; 242/35.6 R
[58] Field of Search ............. 242/35.5 R, 35.5 A, 242/35.6 R, 36, 37 R

[56] References Cited

U.S. PATENT DOCUMENTS

| | | | |
|---|---|---|---|
| 2,679,361 | 5/1954 | Furst | 242/35.5 R |
| 2,783,950 | 3/1957 | Furst | 242/35.5 R |
| 2,908,029 | 10/1959 | Furst | 242/35.5 R X |
| 4,319,720 | 3/1982 | Ueda | 242/35.5 R |

*Primary Examiner*—Stanley N. Gilreath
*Attorney, Agent, or Firm*—Hedman, Gibson, Costigan & Hoare

[57] ABSTRACT

A command and control device for the members carrying out the restoration of thread continuity on coner machines, which maintains the number of interventions of restoration within a maximum preset position, by a central control unit which supplies and conveys the signals between memory registers connected with said control unit; gives the consensus to the interventions conditioned on the verification of the number of interventions taking place; and manages the waiting list of intervention requests exceeding the maximum preset value.

5 Claims, 2 Drawing Sheets

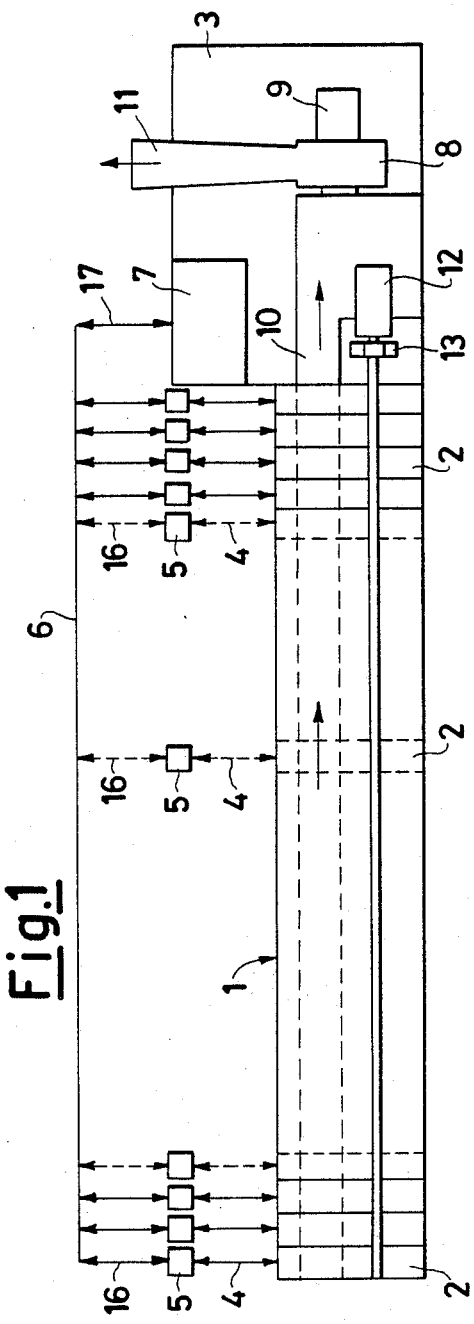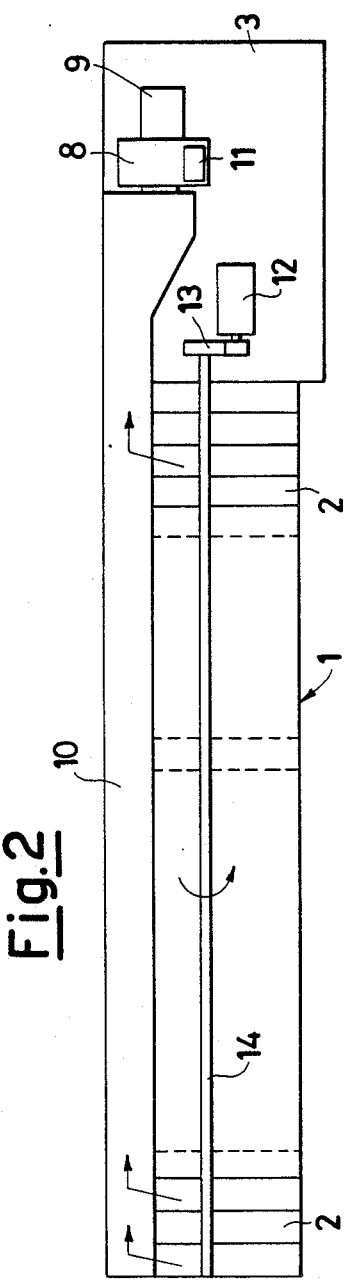

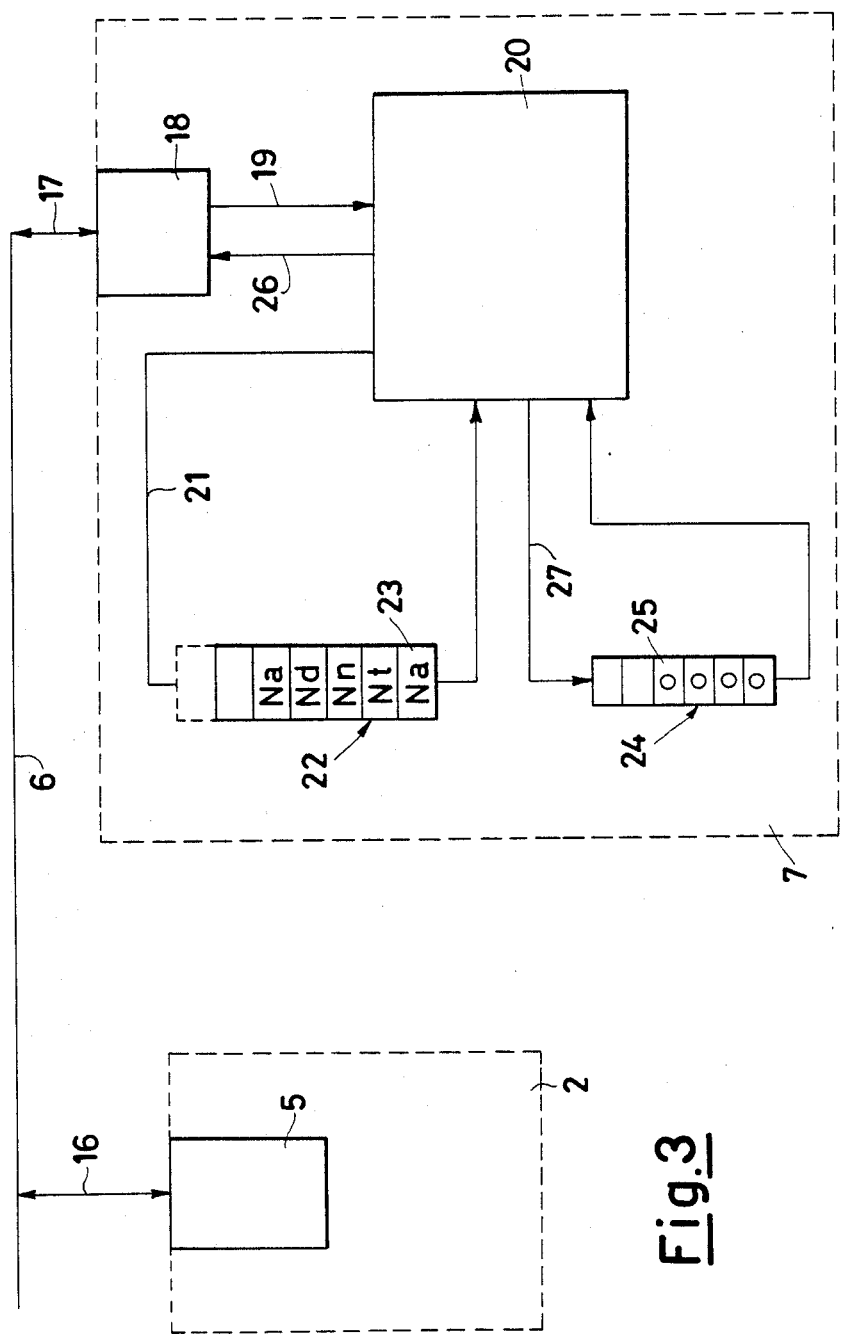

COMMAND AND CONTROL DEVICE FOR THE MEMBERS OF RESTORATION OF THE THREAD CONTINUITY ON CONER MACHINES

The object of the present invention is a control device for the interventions of restoration on coner machines for the production of threads for the textile industry.

The coning operation consists substantially of transferring the thread from a starting package and winding it up on a rigid tube, for forming a wound body of crossing turns, called a "cone".

During the coning operation, the thread is "depuriated" wherein defects, imperfections and faults, i.e., thick places, clots, flashes, weak points, flocks, etc., called "slubs", are removed. Theses slubs are removed by cutting the faulty length and joining the free thread ends.

Such joining can take place either by means of a true knot or by means of a pnumatic or friction joint. A true knot, e.g. a fisherman's knot or a weaver's knot, is produced by a mechanical knotting unit. A pnumatic or friction joint is produced by untwisting the fibers of the cut thread ends, mixing them and twisting them together again, giving again the cut thread its continuity without introducing into the thread the irregularity, even if of minor impact, represented by a true knot.

The operation of depuriation of the thread from its defects is commonly called "slub catching" the defect being detected by a slub catcher. A slub catcher, sensitive to the thread defects, can interupt the thread by itself or can actuate a separate cutting member.

The interuption of the thread causes the braking and stopping of the coning. The thread ends, held by movable suction nozzles, are brought to the joining devices or knotting units and, once joined, the joined thread is brought back to its normal position. Once in its normal position, the coning is started up again wherein the cone and its drive cylinder are restarted from stationary up to a steady state speed which generally corresponds to 600-1,400 meters per minute.

During such operations the machine has both a certain suction capacity, for holding and correctly positioning the broken thread ends and for removing the cut thread lengths, and a certain drive power for driving the different mechanical members of search, positioning and handling both the broken thread and the joined thread.

Generally, the coning machines are equipped with independent or centralized drives of the cylinders which keep the cones moving, and centralized drives for the auxilary services, such as those described above.

They have at one of their ends a control head, which among others, contains the electrical motor which drives the devices carrying out the restoration of the continuity of the thread by means of a long drive shaft. In general, such a drive does not require high power but rather a high torque which, in the presence of a transmission by long drive shafts, can create several kinds of problems.

Such drive is in fact transmitted to a large number of coning positions, commonly denominated as "coning heads", along the front of the machine.

The machine head also contains a centralized suction unit which, by means of a distributor running the whole machine front, allows the suction to be fed to each coning position with sufficient flow rate and vacuum.

The dimensions of the drive system for the thread joining devices, comprising the electrical motor, a belt or gearwheel-coupling and drive shaft and support, must be designed on the basis of the number of contemporaneous interventions of restoration of the continuity of cut or broken thread. Such dimensions follow generally a compromise between the need for quick thread restoration, to limit the stand still time and increase the machine operation factor, and the need for avoiding over-dimensioning, for the purpose of containing the cost of the machine.

Also, the dimensions of the suction system comprising the electrical drive motor, the suction fan and the distributor of the suction, is determined by the number of positions to be served at the same time. Such dimensioning is also performed by following a compromise analogous to that previously mentioned. Such a compromise corresponds, in most cases, to approximately 5-20% of the coning heads of the coner machine.

The purpose of the present invention is to solve the problem of the management of the coner machine when the number of positions to be submitted to the intervention of slub catching and/or of process restarting exceeds the number of positions of intervention for which the machine was designed.

The contemporaneous intervention on an excessive number of positions can have serious consequences on the machine and its operation.

Relating to the centralized drive of the thread restoration devices, both the motor and the shaft, as well as their coupling by means of belts or gearwheels, undergo a much higher stress.

From a purely electrical standpoint, an electrical motor can generally supply power outputs considerably larger than its rated value, at the cost of considerable overheating. Such increased output, conditioned on the limitation of the power supply lines, can be sustained only for very short periods, beyond which the motor becomes irreperably damaged. This condition, from a mechanical point of view, could endanger both the transmission and the shaft wherein such are submitted to an excessively high drive torque.

As for the suction system, the contemporaneous intervention at too many positions causes the lowering of the vacuum level, or more precisely of the pressure differential existing between the external atmosphere and the pressure existing at the nozzles or inside the manifold, below the limit which guarantees the capture of the thread ends and their subsequent correct positioning inside the joining devices, the suction of cut "thread ends" and so forth.

This excessive request for contemporaneous interventions is not a remote possibility but can occur with certain frequency.

Besides the case in which a very irregular material must be processed, or increased processing speeds are used, such an event can occur at the start-up of the coner machine, when the attending operator presses the push buttons or actuates the start-up levers of each coning head, according to a too fast sequence. Such an event can occur with the electronic slub catchers when disturbances to the electrical distribution network, lightnings or overvoltages cause most or all of the slub catchers to generate the intervention command signal. In that case, one can see a true failure of the machine which results in its incapability of compling with all of the intervention requests, and therefore stalls. Once stalled the start-up again requires a laborious operation by the attending personnel.

SUMMARY OF THE INVENTION

The present invention consists of a control and command device for the interventions of thread joining and restart-up of the coner machine, carried out gradually to allow the load due to such intervention to be kept under the safety limit of the coner machine, and of obtaining the maximum efficiency of the machine within said limits.

The device of the present invention consists of the following components:

(a) Interface Devices

Each coning head is provided with an interface device, possibly a microprocessor device, which is interplaced between feelers which signal the need for an intervention and the members which perform the same intervention of restoration of the continuity of the thread and of restarting-up, according to an automated sequence of operations. Such interface is connected with the control unit and signals the control unit with the request for intervention. The control unit which receives the signal from the interface then transmits to the intervention members the consensus and the intervention command, which can be received immediately or after a certain delay. Once the intervention is complete, the interface transmits to the control unit the signal of the end of the intervention (e.g., when the cone starts revolving again).

(b) Control Unit

The central control unit is connected with both the interface devices and with the memory registers. The control unit (i) supplies and conveys the information to and between the memory registers; (ii) verifies the number of coning heads where an intervention is taking place and conditions the consensus to proceed for each new request for intervention once it is verified that the number of interventions presently being taken place has not yet reached the maximum allowed number; (iii) gives the consensus to the intervention through the interface if the number of coning heads where intervention is taking place has not reached the maximum allowed number, and on the contrary if the maximum number has been reached it enters the signal for the request for intervention into the "waiting list"; and (iv) manages the "waiting list", giving its consensus to proceed to the interface device of a new coning head when the signal is received that the intervention is ended from the interface device of another coning head wherein an intervention has taken place.

(c) Memory Unit

The memory unit comprises one or more memory registers which contain signals from and to each interface which are managed by the control unit. At least one of such registers is the operating register and the other possible registers are auxilary registers. Each signal necessarily contains a code of identification of the coning position which sends the signal or which is the object thereof, a time information and an information of the signaling type (request for intervention, consensus to intervention, intervention end) combined in one sequence only.

The time information is provided by the control unit and can consist, e.g., of a true time attributed to a time measuring member; of a progressive serial number assigned by a progressive numbering member, etc., such information being combined with the signal of the identification code. The time information can be controlled by the simple physical order of the initial signals (request for consensus) which is made to slide with advancing of the register.

The information of the signal type can be explicit or implicit. The information of the signal type is explicit when the interface, together with its own identification code, supplies a signal of slub catcher intervened (request for intervention) or a signal of intervention beginning (a signal of intervention taking place), but which is equivalent to the signal of the consensus supplied by the control unit to the interface or a signal of cone running (intervention end).

The information of the intervention type can be implicit.

The sequence of conditions of a coning head can only be cyclical as follows: (i) slub catcher intervened (request for intervention); (ii) intervention in progress; and (iii) cone running (intervention end). A count of the number of signals relating to a coning head supplies the coning head status information.

A number of signals corresponding to 3n, wherein n is a positive integer, zero included, corresponds to a running and normally operating cone or a stationary and excluded cone. A number of signals corresponding to 3n+1 corresponds to a coning head which requested the consensus and is on the waiting list. A number corresponding to 3n+2 corresponds to a coning head on which the intervention is taking place. The results evidence that n corresponds to the number of cycles already carried out on the coning head.

The "waiting list" comprises the requests for intervention corresponding to the detection of the recorded signals of identification codes associated with the most recent time, or the highest serial number. The recorded signals of identification codes associated with the most recent time, or the highest serial number, corresponding to the consensus to the intervention constitutes the list of interventions taking place.

It is preferable to periodically "clean-up" the operating register of the records which relate to the interventions ended, possibly transferring them to the available auxilary registers.

The analysis of the interventions ended may supply very useful information for an optimized management. Such an analysis can identify, on the basis of the distribution of the interventions through the coning positions, both defects in the coning head operation and defects in slub catcher adjustment, occlusions or malfunctioning in the suction devices, etc.

If for example, a coning head requests an excessive number of interventions, as compared to the other coning heads, it would evidence a systematic problem and not a casual defect. In such case the control unit signals to the operator, by means of an alarm, the anomalous frequency of interventions, and possibly stops the suspected position.

The analysis and the processing, also partial, of the recorded data on the concluded interventions can be entrusted to the same control unit. At least the detection of the intervention frequency on each coning position can be entrusted to the same control unit.

DESCRIPTION OF THE DRAWINGS

FIG. 1 shows the front view of the coning machine;
FIG. 2 shows the plan view thereof; and
FIG. 3 shows a systematic view of the interrelationship between the coning head and the control unit.

DETAILED DESCRIPTION OF THE INVENTION

With reference to the drawings, and specifically FIGS. 1 and 2, the automatic coner machine 1 has "n" independant coning heads 2 and a control head 3. Each coning head 2 is identified by its own identification code or number Na, b, c, . . . x, y, z. Each coning head 2 is connected, by means of a connection 4, to its own interface device 5. All of the interface devices 5 are connected through connections 6 to the control unit 7 which contains the memory units.

The suction device 8 is driven by an electrical motor 9 and is installed in the control head 3. The suction device 8 distributes the suction to the coning heads 2 through the duct 10 and performs the exhaust through the duct 11, according to the arrows. The coning heads 2 are driven by an electrical motor 12 linked by the link 13 to the shaft 14 which transmits the motion to each coning head 2.

As already mentioned each coning position is provided with an independant cone drive means. Such drive means comprises cone engagement, disengagement and braking means controlled by the members which perform the check and the restoration of the thread continunity.

During the operation of the coner machine 1 it may occur, e.g., that a certain number of coning heads a, b, c, . . . x, y, z receive from the slub catcher or from the feelers of thread the signal of the presence of interrupted yarn. The coning head 2 commands the cone stopping and, referring to FIG. 3, the microprocessor 5 signals the control unit 7, through serial line 6 and service lines 16 and 17, i.e., as follows:

—coning head No., "ready for cycle" bit—, wherein the coning head No. is the identification code, and the "ready for cycle" bit is the request for the consensus to the intervention by the shaft 14. Through the connection 19, the decoder 18 transmits to a head microprocessor 20, being a part of the control unit 7, information "translated" for being "understood" by the microprocessor 20.

The microprocessor 20, through line 21, stacks the information in the memory register 22, maintaining the order according to which the information arrived. The system logic is that denominated as "first in, first out", i.e., the first information to arrive is the first which leaves. In the operating register 22 there is hence a stack of boxes 23 filled by the identification code of the coning heads 2 waiting for the intervention cycle according to the order in which the consensus requests arrived (in FIG. 3 for example, the signal Na arrived before Nt, Nt before Nn, Nn before Nd, and so forth). Before giving its consensus, the microprocessor 20 verifies the situation of the register 24. The consensus is conditioned on the verification that the interventions taking place are not already in the maximum allowed number, which is equivalent to the positions 25 available in the register 24.

If in the register 24 there are still available positions (in FIG. 3, for example, the number of available positions are six), the microprocessor 20 extracts from the stack's lowest position the identification code of the coning head (e.g., in FIG. 3, the code Na). A signal is then sent, through the line 26, the decoder 18, the lines 17, 6 and 16, to the coning head 2, of the following type:

—coning head No., "start cycle" bit—, wherein the "start cycle" bit constitutes the consensus to the intervention.

At the same time the microprocessor 20 fills a box 25 of the register 24 with a character (in FIG. 3 such a character is shown as by a point) through line 27. It erases from the list of register 22 the last box 23 (from which the last signal was extracted, Na in FIG. 3, and sent to the intervention) and slides downwards the whole stack by one position.

The above reported signal arrives, through the line 16, to the coning head microprocessor 5 which corresponds to the identification code of the signal. The coning head microprocessor 5 arranges for the intervention to take place according to an automatic operation cycle. At the cycle end, the microprocessor 5 emits the return signal:

—coning head No., "cycle performed" bit—, wherein the "cycle performed" bit constitutes the information of intervention end.

The information reaches the head microprocessor 20, through the chain 16, 6, 17, 18, 19, which removes the character from the first box 25 of the register 24, by starting from the top.

Thus, a further position of the register 24 becomes free and, when there are signals in the waiting list in the register 22, the microprocessor 20 gives the consensus to the intervention to another coning head 2 (in FIG. 3, for example, to the coning head Nt).

As can be observed, the decoder 18 translates the information coming from the interfaces constituted by the microprocessors 5 into a coding suitable for being managed by the microprocessor 20 and, vice versa.

What is claimed is:

1. A command and control device for members of restoration of thread continuity under coning on coner machines having more than one coning position, each coning position having one or more feelers used to detect faults in thread and request intervention to restore thread and members which perform said intervention, capable of gradually carrying out thread restoration interventions and maintaining the number of contemporaneous interventions within a preset limit, comprising:

a. an interface device on each coning position of the coner machine, having at least one microprocessor, placed between the feelers used to detect faults in thread and request intervention to restore and the members which perform said intervention;

b. a central control unit, having at least one microprocessor; and c. a memory unit containing two or more memory registers, at least the first of which records the requests for intervention in the form of a waiting list, and the second of which contains a number of positions equal to the maximum number of allowed contemporaneous interventions, which are filled by characters representing interventions taking place, wherein the interface devices at the coning positions requesting intervention through at least one microprocessor send signals along signal lines to at least one microprocessor in the control unit, which records the intervention requests in the first register of the memory unit and monitors the second register of the memory unit to determine whether there are available positions in the second register and when an available position exists in the second register the control unit sends a concensus to intervene along said signal lines to the interface device corresponding to the intervention request taken from the first register and fills the empty position in the second register with a character indicating an intervention taking place, and further wherein upon completion of the intervention at the coning head the interface device signals the control unit along said signal lines that the intervention has ended and the control unit causes the deletion of a character from the second register thereby allowing another concensus to intervene to be sent to another position having requested interventions as recorded on the first register.

2. A command and control device for members of restoration of thread continuity under coning on coner machines as described in claim 1 wherein a decoder is provided between the microprocessor of the interface devices and the microprocessor of the control unit connected by a serial line.

3. A command and control device for members of restoration of thread continuity under coning on coner machines as described in claim 1 further comprising a means for the removal of the signals relating to the ended interventions from the second register.

4. A command and control device for members of restoration of thread continunity under coning on coner machines as described in claim 1 wherein the first register, which contains the signals of coning heads in the waiting list, is fed by the control unit which contains a means to stack in the first register the signals of request for intervention according to the order in which they came, and means to have them all advance by one position each time the control unit gives the concensus to intervention to the particular coning head requesting intervention at the bottom of the register, i.e., which has been the waiting list for a longer time, and deletes it by a means for the removal of the signals.

5. A command and control device for members of restoration of thread continuity under coning on coner machines as described in claim 1 wherein additional memory registers in the memory unit are auxiliary registers which record the ended operation.

* * * * *